(12) United States Patent
Resch

(10) Patent No.: US 10,877,672 B2
(45) Date of Patent: Dec. 29, 2020

(54) AUDITING STORED DATA SLICES IN A DISPERSED STORAGE NETWORK

(71) Applicant: International Business Machines Corporation, Armonk, NY (US)

(72) Inventor: Jason K. Resch, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 153 days.

(21) Appl. No.: 16/051,140

(22) Filed: Jul. 31, 2018

(65) Prior Publication Data
US 2020/0042196 A1    Feb. 6, 2020

(51) Int. Cl.
*H04L 29/06* (2006.01)
*G06F 3/06* (2006.01)
*H04L 9/32* (2006.01)

(52) U.S. Cl.
CPC ........... *G06F 3/0619* (2013.01); *G06F 3/067* (2013.01); *G06F 3/0653* (2013.01); *H04L 9/3218* (2013.01)

(58) Field of Classification Search
CPC ... H04L 9/3218; H04L 9/3221; H04L 9/3271; H04L 29/06857; H04L 29/06863; H04L 29/0687; H04L 9/3236; H04L 9/3242; H04L 9/0643; G06F 3/0619; G06F 16/2365; G06F 21/565; G06F 21/64;
(Continued)

(56) References Cited

U.S. PATENT DOCUMENTS

| 2010/0080391 A1* | 4/2010 | Shah ............ G06F 21/64 380/277 |
| 2013/0238932 A1* | 9/2013 | Resch ........... G06F 21/64 714/20 |

(Continued)

FOREIGN PATENT DOCUMENTS

| CN | 103699851 B | 5/2016 |
| CN | 104811450 B | 10/2017 |
| CN | 107395355 A | 11/2017 |

OTHER PUBLICATIONS

K. Yang and X. Jia, An Efficient and Secure Dynamic Auditing Protocol for Data Storage in Cloud Computing, IEEE Trans. Parallel and Distributed Systems. (Year: 2013).*

(Continued)

*Primary Examiner* — Trong H Nguyen
(74) *Attorney, Agent, or Firm* — James Nock; Andrew D. Wright; Roberts Calderon Safran & Cole, P.C.

(57) ABSTRACT

A method for execution by an auditing unit includes sending a verification request to a storage unit that includes a slice name and a challenge value. A proof of knowledge is received from the storage unit in response, where the proof of knowledge is generated by the storage unit based on a prover output value generated by performing a combined integrity function on the challenge value and slice data associated with the slice name. A verifier output value is generated by the auditing unit as a function of the challenge value and a known slice integrity check value for the slice name. Output verification data is generated by comparing the prover output value to the verifier output value. A corrective action is initiated on the storage unit when the prover output value compares unfavorably to the verifier output value, or when the proof of knowledge is evaluated to be invalid.

20 Claims, 6 Drawing Sheets

(58) Field of Classification Search
CPC .. G06F 11/1004; G06F 16/152; G06F 3/0653; G06F 3/067; H04W 12/10; H04W 12/1006; H04W 12/1008; G07B 2017/00782
See application file for complete search history.

(56) References Cited

U.S. PATENT DOCUMENTS

2014/0359276 A1* 12/2014 Resch ................ H04L 63/0457 713/153
2017/0126684 A1    5/2017 Armknecht et al.
2019/0108350 A1*  4/2019 Bohli ................ G06F 21/6218

OTHER PUBLICATIONS

List of IBM Patents or Patent Applications Treated as Related, dated Jun. 29, 2020, 1 page.
Office Action dated Mar. 27, 2020 in U.S. Appl. No. 16/515,314, 16 pages.
Final Office Action in U.S. Appl. No. 16/515,314 dated Aug. 19, 2020, 7 pages.

* cited by examiner distributed, or dispersed, storage network (DSN) 10

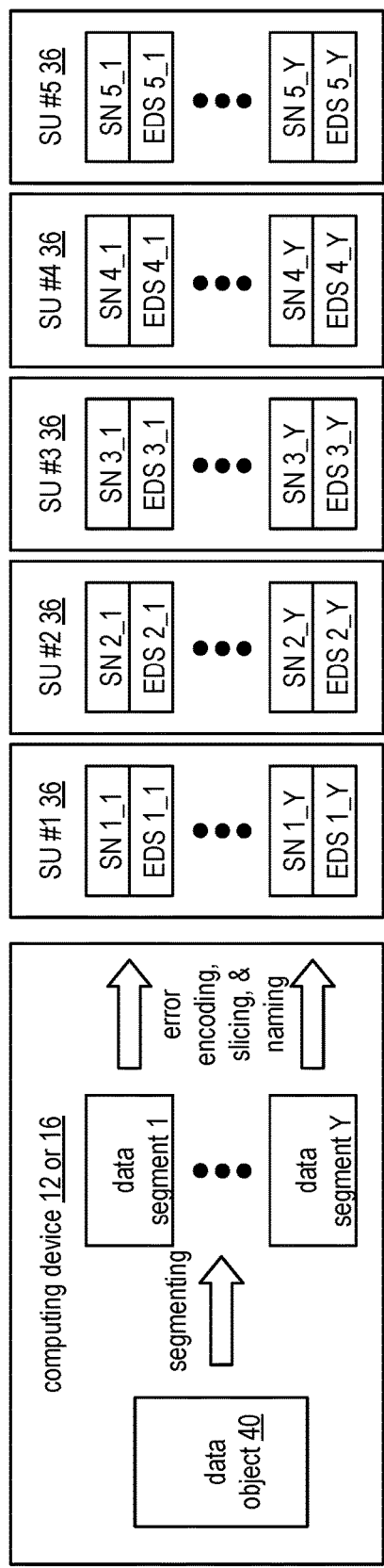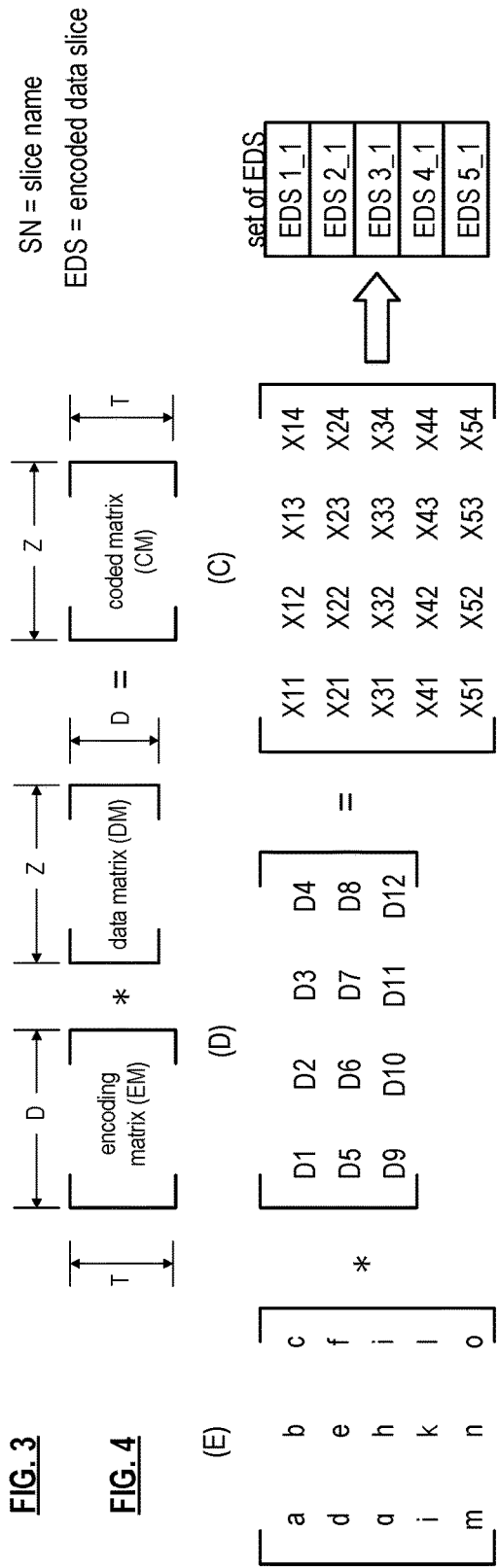

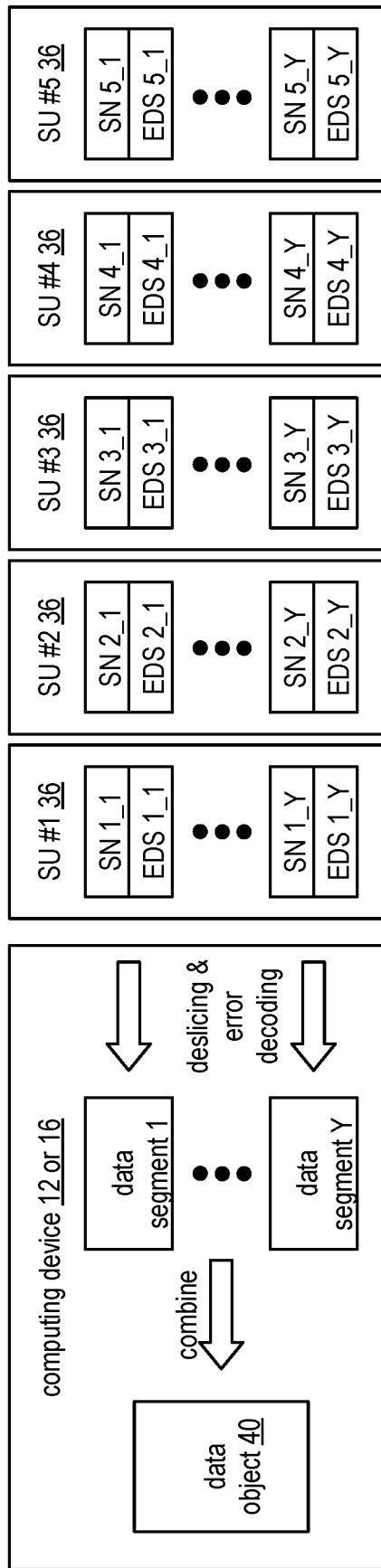

AUDITING STORED DATA SLICES IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
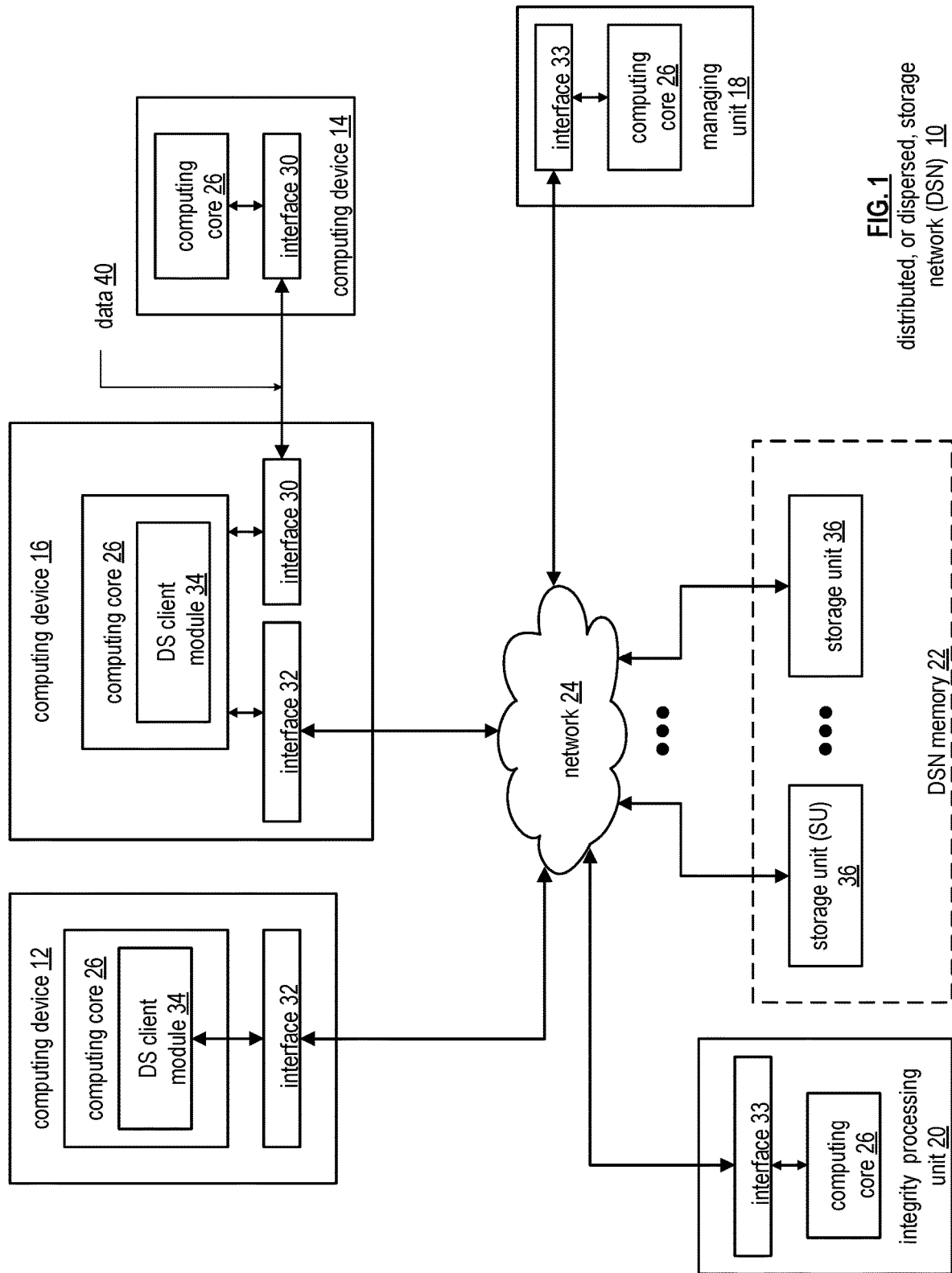
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
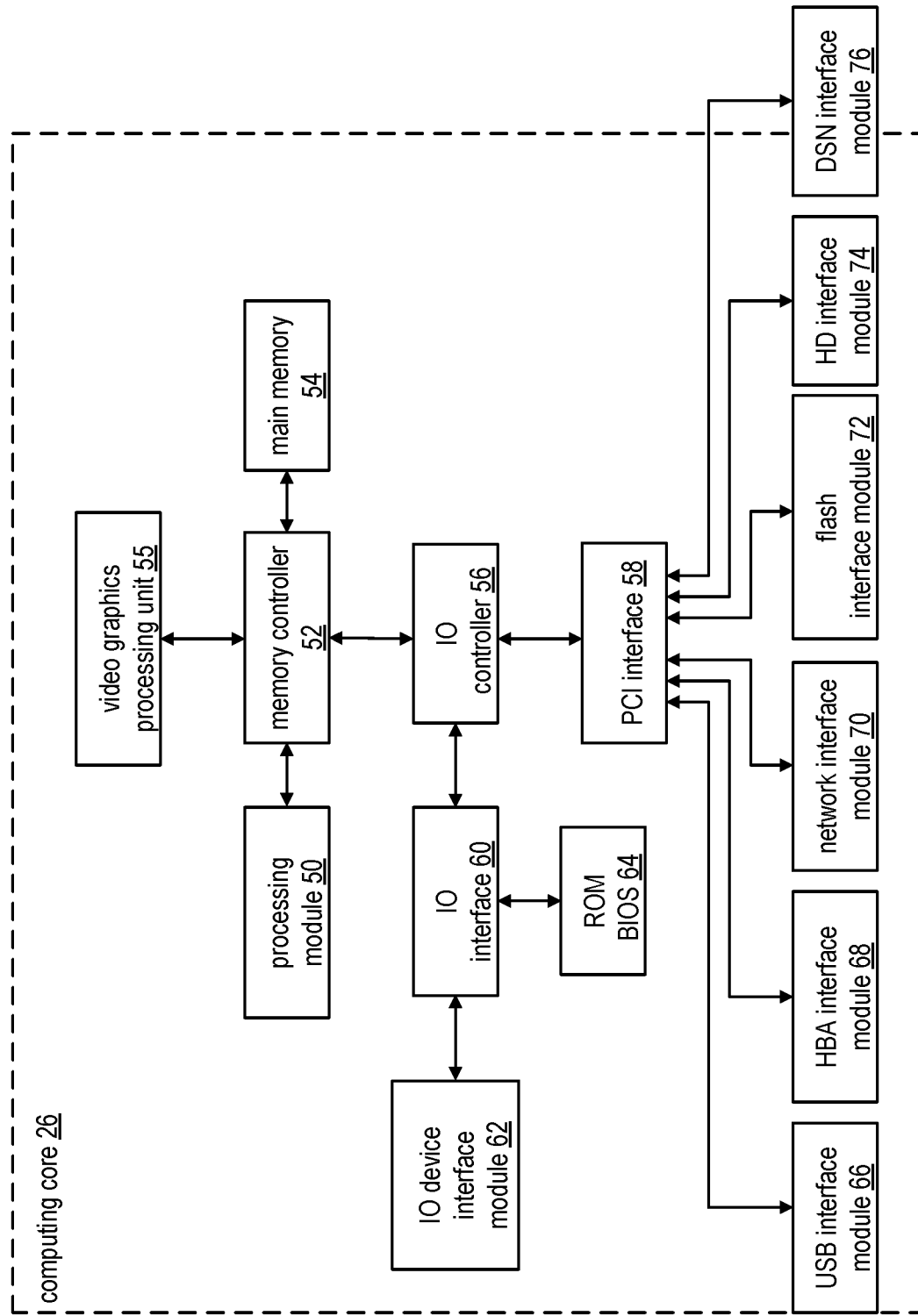
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
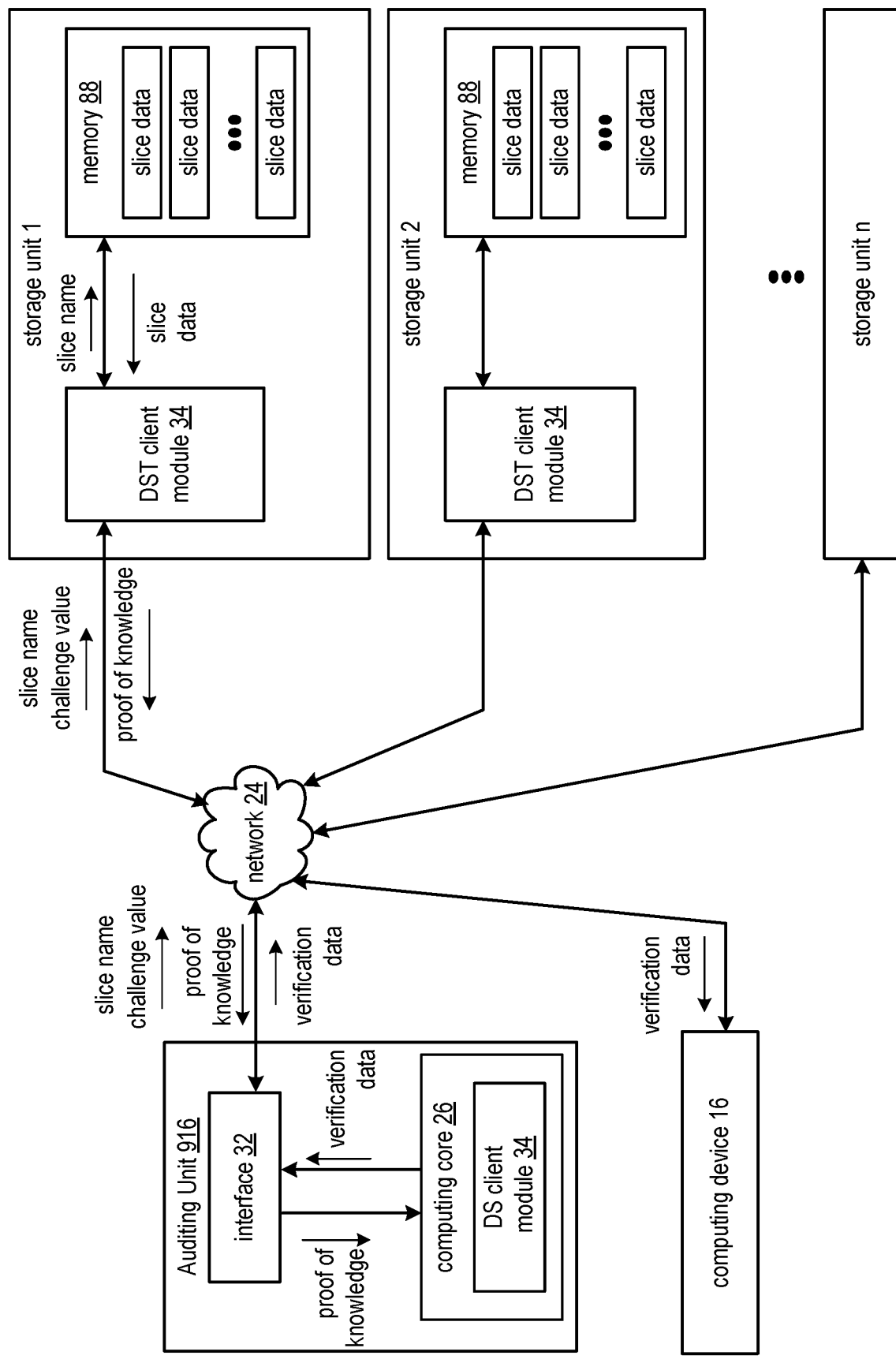
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes an auditing unit 916, the network 24 of FIG. 1, and a plurality of storage units 1-n. The auditing unit 916 can include the interface 32 of FIG. 1, the computing core 26 of FIG. 1, and the DS client module 34 of FIG. 1. The auditing unit 916 can utilize a computing device 16 of FIG. 1, for example, functioning as a dispersed storage processing agent for computing device 14 as described previously. The DSN can further include at least one computing device 16, for example, that is responsible for the set of storage units 1-n. Each storage unit may be implemented utilizing the storage unit 36 of FIG. 1, and can each be implemented as a dispersed storage and task execution unit. Each storage unit 36 can include the DS client module 34 of FIG. 1 and/or a memory 88. The memory 88 can store slice data for encoded data slices, where a set of encoded data slices were created by performing a dispersed error encoding function on a data segment, where the set of encoded data slices are stored in the set of storage units 1-n. The DSN functions to perform an auditing process on stored data slices.

A Zero Knowledge Proof system can enable a storage server to prove it possesses some data in its complete and entire form, in an efficient and easy to verify manner. This can be important for systems that are not entirely trusted. A distributed peer-to-peer system can be built for trading storage resources and verifying that data is still held, without necessitating downloading of the data.

An auditing process can operate in a DSN memory, and/or can be performed by utilizing the auditing unit 916. The auditing process can be tasked with verifying the correct storage of slices held by one or more storage units. The naive mechanism of disclosing the slice to this auditing process can have negative security consequences. For example, while the auditing process may not have access or permission to view the data, it nonetheless it must still have a means of asserting that the one or more storage units still hold the slice.

A trivial means around data exposure can include providing the auditing process with an integrity check value (ICV) such as a CRC, checksum, hash, HMAC, signature, etc. of the slices to verify. The auditing process can query the storage units for the ICV of the slice, and can then verify that the known ICV matches the ICV returned by the storage unit. However, this mechanism is susceptible to forgery by malicious or malfunctioning storage units. For example, the storage unit could simply remember the ICV for the slice, and fail to store a correct version of the slice, allowing it to become corrupted or simply discard it. In cases where the auditing process must assert possession of the slice in the face of malicious or malfunctioning storage units, stronger mechanisms are necessary.

Techniques such as a Zero Knowledge Proof (ZKP), a Non-Interactive Zero Knowledge Proof (ZINK), and/or a zero-knowledge Succinct Noninteractive Argument of Knowledge (zk-SNARK) can be utilized by a DSN to proving possession of knowledge, without revealing that knowledge, to mitigate this problem. In particular, the auditing process can assert that a storage unit possesses the correct slice to a high probability, without the storage unit having to disclose the slice to the auditing process and without the auditing process having to trust the storage unit to behave correctly and honestly.

To do so, a combined integrity function can be constructed that takes two parameters: a slice data parameter and a challenge parameter. The slice data parameter can include the slice data to be audited, and the challenge parameter can include a challenge value, which can be randomly selected by the auditing process. Performing the combined integrity function can include performing a slice integrity check function on the supplied slice data parameter to compute a slice ICV. Performing the combined integrity function can further include computing a combined integrity check value of the slice ICV and the challenge value. The function performed on the slice data to compute the slice ICV and the function performed on the combination of the slice ICV and the challenge value can be the same or different function.

In some embodiments, the slice integrity check function can include a secure collision-resistant function, such an HMAC function, a Mask Generating Function, and/or a secure hash function such as the SHA_256 hash function. Performing the combined integrity function can first include performing the secure collision-resistant function on the slice data parameter to generate a slice ICV. Performing the combined integrity function can next include performing the secure collision-resistant function on a combination of the slice ICV and the challenge value. If the slice ICV is already known, for example, by the auditing process, this second step can be applied directly the known slice ICV value and the challenge value. For example, the secure collision-resistant function can be performed on the sum of the computed slice ICV and the challenge value, on the result of an OR operation performed on the computed slice ICV and the challenge value, and/or on the result of an exclusive OR operation performed on the computed slice ICV and the challenge value.

For example, if the SHA_256 hash function is utilized, a combined integrity function "F" can be defined as follows to compute an output value:

$$F(\text{slice\_data}, \text{challenge}) = \text{SHA\_256}(\text{SHA\_256}(\text{slice\_data}) \| \text{challenge})$$

Here, "slice_data" denotes the slice data, "challenge" denotes the randomly selected challenge value, and "$\|$" denotes the OR operation.

In this fashion, an auditing unit or other entity responsible for performing auditing process, i.e. the "verifier", can correctly predict the output of the combined integrity function when computed by the storage unit based on prior knowledge of the slice ICV for the slice data and its knowledge of the challenge value, and can perform the combined integrity function to generate a verifier output value. By utilizing a ZKP process, the storage unit, i.e. the "prover", can utilize the combined integrity function to create a proof or argument of knowledge that the storage unit knows the slice data, and is thus in possession of the slice data. In particular, the storage unit can utilize the received slice name to fetch the corresponding slice data, can perform the combined integrity function by first performing the secure collision-resistant function of the combined integrity function on the slice data to generate the slice ICV, and by performing the secure collision-resistant function again on a combination value of the slice ICV and the challenge value to generate a prover output value. The storage unit can generate the proof of knowledge based on this prover output value. The proof of knowledge, if verified to be correct, can indicate that with a very high probability, such as a probability of one or a probability that is greater than a proof of knowledge probability threshold, that the storage unit is in possession of the input data (in particular, the slice data) that was utilized to generate the output data in performing the combined integrity function. Furthermore, if the storage unit is indeed properly storing the slice data associated with the slice ICV, the prover output value and verifier output value will match, indicating that the input data used to generate the prover output value matches the input data used to generate the verifier output value. If the storage unit is improperly storing the slice data, the prover output value and verifier output value will mismatch with a high probability.

As depicted in FIG. 9, an auditing unit 916, or other entity in a DSN that includes a processor and memory that communicates with storage units, can perform this auditing process. The auditing process begins with the auditing unit sending a verification request for a storage unit to verify possession of a data slice. The verification request can include a slice name for the data slice to be verified, as well as a challenge value. The challenge value can be randomly and/or pseudo-randomly determined by the auditing unit. For example, the challenge value can be chosen randomly, can be selected by utilizing a random number generator, or can be otherwise determined from an unpredictable source. The unpredictability of the challenge value received by the storage unit can ensure that storage units are unable to predict challenge values or pre-generate proofs. In particular, this ensures that storage units must hold the slice data until the random, unpredictable challenge value is received to generate their proof of knowledge.

The storage unit, upon receiving the request, can retrieve the data slice in its memory based on the received slice name. The storage unit can perform the combined integrity function on the data slice and the received challenge value to compute a prover output value. In particular, the storage unit can first calculate the slice ICV from the slice data by performing a secure collision-resistant function, and can then perform the secure collision-resistant function again on the combination of the computed slice ICV and the received challenge value to generate a prover output value. The storage unit can further construct a proof or argument of knowledge by utilizing a ZKP, ZINK, nk-SNARK, or other mechanism to prove that it knows an input to the combined integrity function which yields the prover output value that the storage unit computed for the combined integrity function when utilizing the slice data for the requested slice name, and the challenge value from the request. The storage unit can then transmit this computed proof to the auditing unit 916.

The auditing unit 916 can generate verification data to verify whether the storage unit is in possession of the correct slice data. This can include first verifying the proof of knowledge itself by generating proof of knowledge verification data by evaluating the proof of knowledge for correctness to determine whether the storage unit is in possession of input to the combined integrity function that yields the received prover output value, with a high probability. Verifying the storage unit is in possession of input to the combined integrity function that yields the prover output value indicates with a high probability that the storage unit is in possession of some slice data that yields the prover output value. The auditing unit 916 can generate the proof of knowledge verification data according to the zero-knowledge proof process.

Secondly, the auditing unit 916 can determine whether the prover output value computed in the proof is correct, to determine whether the slice data used generate the prover output value corresponds to the known slice ICV. To do so, the auditing unit 916 can generate its own verifier output value for its known slice ICV and the challenge value by performing the combined integrity function on the combination of the known slice ICV and the challenge value. In particular, the auditing unit 916 can perform the collision-resistant hash function on the combination of the known slice ICV and the challenge value to generate the verifier output value. The known slice ICV can be fetched from a private memory, where the private memory is accessible by the auditing unit, but not by the storage unit. In some embodiments, the storage unit or another entity such as a computing device 16 that was responsible for initial storage of the slice data can generate the known slice ICV upon initial storage of the slice data, or in response to a most recent authorized update of the slice data, for storage in this private memory and/or for transmission to the auditing unit 916.

The auditing unit can generate output verification data by comparing the prover output, for example, extracted from the received proof of knowledge or received with the proof of knowledge, to the verifier output value. If the prover output value matches, is in agreement with, or otherwise compares favorably to the verifier output value, along with the verification that the proof of knowledge is correct, then the auditing unit 916 can assert that the storage unit is in possession of the proper slice data for the data slice. If either the proof of knowledge itself or the output value is determined to be incorrect, the auditing unit can flag the storage unit as not being in proper possession of the correct slice data, which can lead to other corrective actions such as initiating a rebuild or other investigation into the correct operation of the storage unit.

In some embodiments, as the slice data is meant to be private from the auditing unit, a notification of the flagged storage unit can be sent to another entity of the DSN such as a computing device 16 that is responsible for the set of storage units, and the computing device can facilitate performance of a rebuild of the slice data and/or of other slices stored by a flagged storage unit in response to determining storage unit is not in possession of the data slice. In particular, the computing device can rebuild the slice data by performing a rebuild of the data segment the slice data belongs to, by utilizing a read threshold number of the set of encoded data slices that are determined to be properly stored in the set of storage units. The computing device can firstly retrieve a read threshold number of the set of encoded data slices, can secondly perform a dispersed error decode function on the read threshold number of the set of encoded data slices to generate a reproduced data segment, can thirdly generate a rebuilt encoded data slice corresponding to the slice name of the slice data by performing a dispersed error encode function on the reproduced data segment, and can fourthly facilitate storage of the rebuilt encoded data slice in one of the set of storage units. In some embodiments, the rebuilt encoded data slice will be assigned a new slice name and/or will be stored in a different storage unit in response to determining the original storage unit improperly stored the data slice. In some embodiments, the computing device will perform a similar rebuild of some or all additional slices stored by the storage unit for storage in one or more new storage units, and/or will otherwise facilitate decommissioning and/or rebuilding of the storage unit as a whole.

In some embodiments, the auditing process can be utilized to verify the proper storage of a data segment as a whole. In particular, the auditing process can determine how many encoded data slices of the data segment are properly being stored in their set of storage units. The auditing unit can send verification requests to the set of storage units, where each request indicates the slice name of the encoded data slice designated for storage in the corresponding one of the set of storage units. The challenge value sent to each storage unit in the set of verification requests can be the same or different for some or all of the storage units. Each storage unit can respond with proof of knowledge for the slice data of the encoded data slice indicated by the slice name accordingly by utilizing the combined integrity function to produce their own prover output values. The auditing unit can evaluate each of the proofs of knowledge for correctness to determine if each storage unit was in possession of the input utilized to generate the prover output value via the combined integrity function. The auditing unit can determine a subset of the storage units with verified proof of knowledge data. The auditing unit can generate a corresponding set of verifier output values for each encoded data slice by utilizing known slice ICVs for each encoded data slice of the data segment. This set of verifier output values can be compared to the corresponding prover output values, and/or the set of proofs of knowledge received from the set of storage units can be otherwise analyzed to generate output verification data.

The auditing unit can utilize the output verification data, and the verification of the proofs of knowledge to determine which of the set of encoded data slices are correctly stored in their designated storage units. If the number is less than all of the encoded data slices of the data segment, but is greater than equal to the read threshold number of encoded data slices of the data segment, the improperly stored data slices can be rebuilt by utilizing the read threshold number of encoded data slices, for example, by the computing device 16 as described previously. If the number is less than the read threshold, the data segment can be determined to be incorrectly stored, and a rebuild may not be possible. The storage units responsible for any improperly stored encoded data slices can be flagged for rebuilding and/or decommissioning as described previously.

Figure 10:
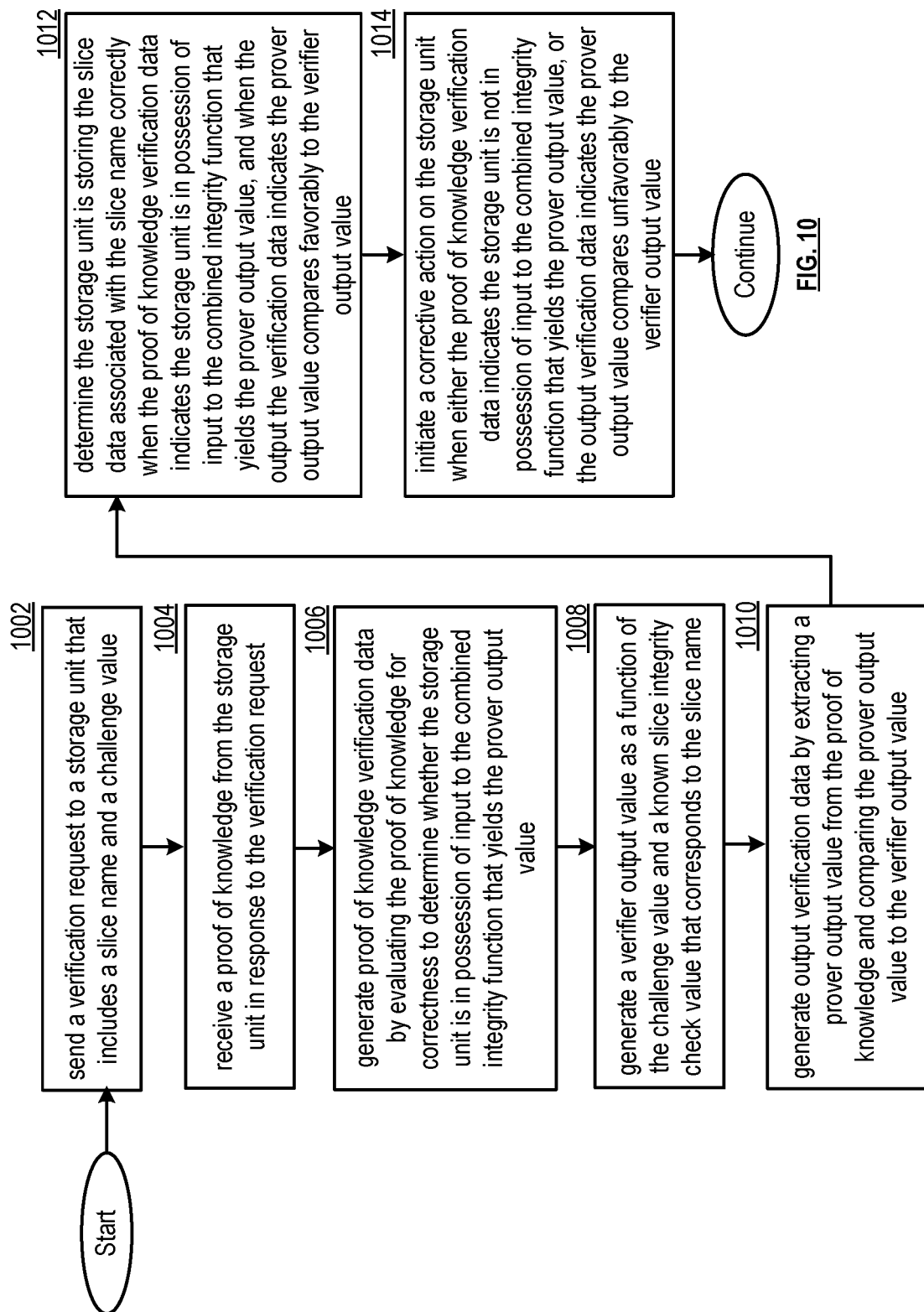
FIG. 10 is a logic diagram of an example of a method of performing an auditing process for stored slice data in accordance with the present invention.

FIG. 10 is a flowchart illustrating an example of performing an auditing process for stored slice data. In particular, a method is presented for use in association with one or more functions and features described in conjunction with FIGS. 1-9, for execution by an auditing unit that includes a processor or via another processing system of a dispersed storage network that includes at least one processor and memory that stores instruction that configure the processor or processors to perform the steps described below.

Step 1002 includes sending a verification request to a storage unit. The verification request includes a slice name and a challenge value. The challenge value can be randomly and/or pseudo-randomly generated. Step 1004 includes receiving a proof of knowledge from the storage unit in response to the verification request. The proof of knowledge is generated by the storage unit based on a prover output value, where the prover output value is generated by the storage unit by performing a combined integrity function on slice data and the challenge value, where the slice data is retrieved by the storage unit from memory based on the slice name. In particular, generating the prover output value can include firstly performing a secure collision-resistant function on the slice data to generate a candidate slice integrity check value, next performing a combining operation on the candidate slice integrity check value and the challenge value to generate a combined value, and finally performing the secure collision-resistant function on the combined value to generate the prover output value. The combining operation includes an OR operation. The secure collision-resistant function can include a secure hash function such as the SHA_256 hash function, an HMAC function, and/or a Mask Generating Function. The proof of knowledge can be generated in accordance with a Zero Knowledge Proof (ZKP), a Non-Interactive Zero Knowledge Proof (ZINK), and/or a zero-knowledge Succinct Noninteractive Argument of Knowledge (zk-SNARK). The slice data can be irreproducible from the proof of knowledge and/or can be irreproducible from the prover output value.

Step 1006 includes generating proof of knowledge verification data by evaluating the proof of knowledge for correctness to determine whether the storage unit is in possession of input to the combined integrity function that yields the prover output value. For example, the proof of knowledge can be evaluated in accordance with a Zero Knowledge Proof (ZKP), a Non-Interactive Zero Knowledge Proof (ZINK), and/or a zero-knowledge Succinct Noninteractive Argument of Knowledge (zk-SNARK).

Step 1008 includes generating a verifier output value as a function of the challenge value and a known slice integrity check value that corresponds to the slice name. The known slice data can be retrieved a private memory that is accessible by the auditing unit but not by the storage unit. The known slice integrity value can have been generated by a different entity in conjunction with initial storage of the slice data or a most recent authorized update of the slice data for transmission to the auditing unit and/or for storage in the private memory. Generating the verifier output value can include first performing a combining operation on the known slice integrity check value and the challenge value to generate a combined value, and next performing a secure collision-resistant function on the combined value to generate the verifier output value. The combining function and the secure collision-resistant function can be the same functions as those utilized to generate the prover output value, and/or can include an OR operation, and/or a SHA_256 hash function respectively.

Step 1010 includes generating output verification data by extracting a prover output value from the proof of knowledge and comparing the prover output value to the verifier output value. Step 1012 includes determining the storage unit is storing the slice data associated with the slice name correctly when the proof of knowledge verification data indicates the storage unit is in possession of input to the combined integrity function that yields the prover output value, and when the output verification data indicates the prover output value matches, or otherwise compares favorably to, the verifier output value. Step 1014 includes initiating a corrective action on the storage unit when either the either the proof of knowledge verification data indicates the storage unit is not in possession of input to the combined integrity function that yields the prover output value, or the verification data indicates the prover output value does not match, or otherwise compares unfavorably to, the verifier output value.

In some embodiments, the auditing unit can forego performance of steps 1008 and 1010 in response to determining the proof of knowledge verification data indicates the storage unit is not in possession of input to the combined integrity function, and can determine initiate the corrective action on the storage unit in response to determining the invalidity of the proof of knowledge.

Step 1012 and/or step 1014 can include transmitting a notification indicating the proof of knowledge verification data, the output verification data, the slice name, and/or the storage unit to another entity of the DSN, such as a computing device 16. For example, a data segment can have been dispersed storage error encoded to produce a set of encoded data slices for storage in a set of storage units that includes the storage unit, where the slice name corresponds to one of the set of encoded data slices. Initiating the corrective action can include transmitting a slice error notification that indicates the slice name and/or the storage unit to a computing device. The computing device, in response to receiving the slice error notification, can retrieves a read threshold number of the set of encoded data slices. The computing device can then perform a dispersed error decode function on the read threshold number of the set of encoded data slices to generate a reproduced data segment. The computing device can then generate a rebuilt encoded data slice corresponding to the slice name by performing a dispersed error encode function on the reproduced data segment. The computing device can then facilitate storage of the rebuilt encoded data slice in one of the set of storage units. The one of the set of storage unit can be different from the storage unit determined to improperly store the data slice. The computing device can further perform a rebuild and/or decommissioning on the storage unit as a whole.

In various embodiments, the auditing unit determines to verify a data segment in storage, where the data segment was dispersed storage error encoded to produce a set of encoded data slices for storage in a set of storage units that includes the storage unit. A set of verification requests can be sent to the set of storage units, where each of the set of verification requests include one of a set of slice names corresponding to the set of encoded data slices, and where each of the set of verification requests includes one of a set of pseudo-randomly generated challenge values. The set of verification requests can include the verification request.

A set of proof of knowledges can be received from the set of storage units in response to the set of verification requests, where each of the set of proof of knowledge is generated by one of the set of storage units based on a prover output value, where the prover output value is generated by the one of the set of storage units by performing a combined integrity function on slice data and the challenge value, and where the slice data is retrieved by the one of the set of storage units from memory based on the one of the set of slice names included in one of the set of verification requests received by the one of the set of storage units.

A set of proof of knowledge verification data can be generated by evaluating each proof of knowledge for correctness to determine whether each of the set of storage is in possession of input to the combined integrity function that yields the corresponding prover output value. A set of verifier output values can be generated for each of the set of verification requests, where each of the set of verifier output values is a function of the one of the set of pseudo-randomly generated challenge values of a corresponding one of the set of verification requests and is further a function of one of a set of known slice integrity check values that corresponds to the one of the set of slice names of the corresponding one of the set of verification requests. The set of verifier output values can include the verifier output value. A set of output verification data can be generated by extracting the prover output value from each of the set of proof of knowledges and comparing the prover output value to one of the set of verifier output values corresponding to the one of the set of verification requests for which the to the one of the set proof of knowledges was received in response.

The data segment can be determined to be stored correctly in the set of storage units when the set of proof of knowledge verification data indicates a subset of the set of storage units are in possession of input to the combined integrity function that yields the corresponding prover output value, and when the set of output verification data indicates at least a threshold number of the set of verifier output values of the subset of the set of storage units compare favorably to a corresponding prover output value. Corrective action on the set of storage units can be initiated when the output verification data indicates less than a threshold number of the set of verifier output values of the subset of the set of storage units compare favorably to the corresponding one of the set of prover output values.

In various embodiments, the threshold number is equal to a total number of the set of verifier output values. In various embodiments, the data segment was dispersed storage error encoded by utilizing an information dispersal algorithm, and the threshold number is equal to a read threshold of the information dispersal algorithm. In various embodiments, the output verification data indicates that at least the threshold number of the set of verifier output values of the subset of the set of storage units compare favorably to the corresponding one of the set of prover output values. A slice error notification can be transmitted to a computing device in response to determining the output verification data further indicates that at least one of the set of verifier output values compares unfavorably to the corresponding one of the set of prover output values, and/or when at least one of the set of proofs of knowledge is determined to be incorrect, where the slice error notification includes at least one slice name of the set of slice names corresponding the at least one of the set of verifier output values and/or to the at least one of the set of proofs of knowledge. The computing device, in response to receiving the slice error notification, can retrieve at least the read threshold number of the set of encoded data slices from the set of storage units, where the at least the read threshold number of the set of encoded data slices does not include ones of the set of encoded data slices corresponding to the at least one slice name included in the slice error notification. The computing device can then perform a dispersed error decode function on the at least the read threshold number of the set of encoded data slices to generate a reproduced data segment. The computing device can generate at least one rebuilt encoded data slice corresponding to the at least one slice name by performing a dispersed error encode function on the reproduced data segment, and can facilitate storage of the at least one rebuilt encoded data slice in at least one of the set of storage units, such as storage units that were not indicated to be improperly storing encoded data slices of the data segments.

In various embodiments, a non-transitory computer readable storage medium includes at least one memory section that stores operational instructions that, when executed by a processing system of a dispersed storage network (DSN) that includes a processor and a memory, causes the processing system to send a verification request to a storage unit, where the verification request includes a slice name, and where the verification request further includes a challenge value. A proof of knowledge is received from the storage unit in response to the verification request, where the proof of knowledge is generated by the storage unit based on a prover output value, where the prover output value is generated by the storage unit by performing a combined integrity function on slice data and the challenge value, and where the slice data is retrieved by the storage unit from memory based on the slice name. Proof of knowledge verification data is generated by evaluating the proof of knowledge for correctness to determine whether the storage unit is in possession of input to the combined integrity function that yields the prover output value. A verifier output value is generated as a function of the challenge value and a known slice integrity check value that corresponds to the slice name. Output verification data is generated by extracting the prover output value from the proof of knowledge and comparing the prover output value to the verifier output value. The storage unit is determined to be correctly storing the slice data associated with the slice name when the proof of knowledge verification data indicates the storage unit is in possession of input to the combined integrity function that yields the prover output value, and when the output verification data indicates the prover output value compares favorably to the verifier output value. A corrective action is initiated on the storage unit when either the proof of knowledge verification data indicates the storage unit is not in possession of input to the combined integrity function that yields the prover output value, or the output verification data indicates the prover output value compares unfavorably to the verifier output value.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an auditing unit that includes a processor, the method comprises:
    sending a verification request to a storage unit, wherein the verification request includes a slice name, and wherein the verification request further includes a challenge value;
    receiving a proof of knowledge from the storage unit in response to the verification request, wherein the proof of knowledge is generated by the storage unit based on a prover output value, wherein the prover output value is generated by the storage unit by performing a combined integrity function on slice data and the challenge value, and wherein the slice data is retrieved by the storage unit from memory based on the slice name;
    generating proof of knowledge verification data by evaluating the proof of knowledge for correctness to determine whether the storage unit is in possession of input to the combined integrity function that yields the prover output value;
    generating a verifier output value as a function of the challenge value and a known slice integrity check value that corresponds to the slice name;
    generating output verification data by extracting the prover output value from the proof of knowledge and comparing the prover output value to the verifier output value to determine if the prover output value matches the verifier output value;
    determining the storage unit is storing the slice data associated with the slice name correctly when the proof of knowledge verification data indicates the storage unit is in possession of input to the combined integrity function that yields the prover output value, and when the output verification data indicates the prover output value matches the verifier output value; and
    initiating a corrective action on the storage unit when at least on of: the proof of knowledge verification data indicates the storage unit is not in possession of input to the combined integrity function that yields the prover output value, or the output verification data indicates the prover output value does not match the verifier output value.

2. The method of claim 1,
    wherein generating the prover output value includes:
        performing a secure collision-resistant function on the slice data to generate a candidate slice integrity check value;
        performing a combining operation on the candidate slice integrity check value and the challenge value to generate a first combined value; and
        performing the secure collision-resistant function on the first combined value to generate the prover output value;
    and wherein generating the verifier output value includes:
        performing the combining operation on the known slice integrity check value and the challenge value to generate a second combined value; and
        performing the secure collision-resistant function on the second combined value to generate the verifier output value.

3. The method of claim 2, wherein the combining operation includes an OR operation.

4. The method of claim 2, wherein the secure collision-resistant function includes a secure hash algorithm (SHA)-256 hash function.

5. The method of claim 1, wherein the proof of knowledge is generated in accordance with one of: a Zero Knowledge Proof (ZKP), a Non-Interactive Zero Knowledge Proof (ZINK), or a zero-knowledge Succinct Noninteractive Argument of Knowledge (zk-SNARK), and wherein the slice data is irreproducible from the proof of knowledge.

6. The method of claim 1, further comprising selecting the challenge value based on a result of performing at least one of: a random or a pseudo-random function.

7. The method of claim 1, wherein the initiating the corrective action includes facilitating a rebuild of the storage unit.

8. The method of claim 1, wherein the known slice integrity check value was generated in conjunction with initial storage of the slice data in the storage unit.

9. The method of claim 1, wherein a data segment was dispersed storage error encoded to produce a set of encoded data slices for storage in a set of storage units that includes the storage unit, wherein the slice name corresponds to one of the set of encoded data slices, wherein initiating the corrective action includes transmitting a slice error notification that indicates the slice name to a computing device, wherein the computing device, in response to receiving the slice error notification:
- retrieves a read threshold number of the set of encoded data slices;
- performs a dispersed error decode function on the read threshold number of the set of encoded data slices to generate a reproduced data segment;
- generates a rebuilt encoded data slice corresponding to the slice name by performing a dispersed error encode function on the reproduced data segment; and
- facilitates storage of the rebuilt encoded data slice in one of the set of storage units.

10. The method of claim 9, wherein the one of the set of storage units is different from the storage unit.

11. The method of claim 1, further comprising:
- determining to verify a data segment in storage, wherein the data segment was dispersed storage error encoded to produce a set of encoded data slices for storage in a set of storage units that includes the storage unit;
- sending a set of verification requests to the set of storage units, wherein each of the set of verification requests includes one of a set of slice names corresponding to the set of encoded data slices, wherein each of the set of verification requests includes one of a set of pseudo-randomly generated challenge values, and wherein the set of verification requests includes the verification request;
- receiving a set of proof of knowledges from the set of storage units in response to the set of verification requests, wherein each of the set of proof of knowledges is generated by one of the set of storage units based on another prover output value, wherein the other prover output value is generated by the one of the set of storage units by performing another combined integrity function on other slice data and the challenge value, and wherein the other slice data is retrieved by the one of the set of storage units from memory based on the one of the set of slice names included in one of the set of verification requests received by the one of the set of storage units;
- generating a set of proof of knowledge verification data by evaluating each proof of knowledges for correctness to determine whether each of the set of storage units is in possession of input to the other combined integrity function that yields the corresponding other prover output value;
- generating a set of verifier output values for each of the set of verification requests, wherein each of the set of verifier output values is a function of the one of the set of pseudo-randomly generated challenge values of a corresponding one of the set of verification requests and is further a function of one of a set of known slice integrity check values that corresponds to the one of the set of slice names of a corresponding one of the set of verification requests, wherein the set of verifier output values includes the verifier output value;
- generating a set of output verification data by extracting the other prover output value from each of the set of proof of knowledges and comparing the other prover output value to one of the set of verifier output values corresponding to the one of the set of verification requests for which the one of the set of proof of knowledges was received in response;
- determining the data segment is stored correctly in the set of storage units when the set of proof of knowledge verification data indicates a subset of the set of storage units are in possession of input to the other combined integrity function that yields the corresponding other prover output value, and when the set of output verification data indicates at least a threshold number of the set of verifier output values of the subset of the set of storage units compare favorably to a corresponding other prover output value; and
- initiating corrective action on the set of storage units when at least one of: the set of proof of knowledge verification data indicates the storage unit is not in possession of input to the other combined integrity function that yields the other prover output value or the set of output verification data indicates the other prover output value does not match the verifier output value.

12. The method of claim 11, wherein the threshold number is equal to a total number of the set of verifier output values.

13. The method of claim 11, wherein the data segment was dispersed storage error encoded by utilizing an information dispersal algorithm, and wherein the threshold number is equal to a read threshold number of the information dispersal algorithm.

14. The method of claim 13, wherein the set of output verification data indicates that at least the threshold number of the set of verifier output values of the subset of the set of storage units compare favorably to the corresponding other prover output value, further comprising:
- transmitting a slice error notification to a computing device in response to determining the set of output verification data further indicates that at least one of the set of verifier output values does not match the corresponding other prover output value, wherein the slice error notification includes at least one slice name of the set of slice names corresponding to the at least one of the set of verifier output values, and wherein the computing device, in response to receiving the slice error notification:
- retrieves at least a read threshold number of the set of encoded data slices from the set of storage units, wherein the at least the read threshold number of the set of encoded data slices does not include ones of the set of encoded data slices corresponding to the at least one slice name included in the slice error notification;
- performs a dispersed error decode function on the at least the read threshold number of the set of encoded data slices to generate a reproduced data segment;
- generates at least one rebuilt encoded data slice corresponding to the at least one slice name by performing a dispersed error encode function on the reproduced data segment; and
- facilitates storage of the at least one rebuilt encoded data slice in at least one of the set of storage units.

15. A processing system of an auditing unit comprises: at least one processor;
a memory that stores operational instructions, that when executed by the at least one processor cause the processing system to:

send a verification request to a storage unit, wherein the verification request includes a slice name, and wherein the verification request further includes a challenge value;

receive a proof of knowledge from the storage unit in response to the verification request, wherein the proof of knowledge is generated by the storage unit based on a prover output value, wherein the prover output value is generated by the storage unit by performing a combined integrity function on slice data and the challenge value, and wherein the slice data is retrieved by the storage unit from memory based on the slice name;

generate proof of knowledge verification data by evaluating the proof of knowledge for correctness to determine whether the storage unit is in possession of input to the combined integrity function that yields the prover output value;

generate a verifier output value as a function of the challenge value and a known slice integrity check value that corresponds to the slice name;

generate output verification data by extracting the prover output value from the proof of knowledge and comparing the prover output value to the verifier output value;

determine the storage unit is storing the slice data associated with the slice name correctly when the proof of knowledge verification data indicates the storage unit is in possession of input to the combined integrity function that yields the prover output value, and when the output verification data indicates the prover output value compares favorably to the verifier output value; and initiate a corrective action on the storage unit when at least one of: the proof of knowledge verification data indicates the storage unit is not in possession of input to the combined integrity function that yields the prover output value, or the output verification data indicates the prover output value compares unfavorably to the verifier output value.

16. The processing system of claim 15,
wherein generating the prover output value includes:
performing a secure collision-resistant function on the slice data to generate a candidate slice integrity check value;
performing a combining operation on the candidate slice integrity check value and the challenge value to generate a first combined value; and
performing the secure collision-resistant function on the first combined value to generate the prover output value;
and wherein generating the verifier output value includes:
performing the combining operation on the known slice integrity check value and the challenge value to generate a second combined value; and
performing the secure collision-resistant function on the second combined value to generate the verifier output value.

17. The processing system of claim 15, wherein the proof of knowledge is generated in
accordance with one of: a Zero Knowledge Proof (ZKP), a Non-Interactive Zero Knowledge Proof (ZINK), or a zero-knowledge Succinct Noninteractive Argument of Knowledge (zk-SNARK), and wherein the slice data is irreproducible from the proof of knowledge.

18. The processing system of claim 15, wherein the known slice integrity check value was generated in conjunction with initial storage of the slice data in the storage unit.

19. The processing system of claim 15, wherein the operational instructions, when executed by the at least one processor, further cause the processing system to:

determine to verify a data segment in storage, wherein the data segment was dispersed storage error encoded to produce a set of encoded data slices for storage in a set of storage units that includes the storage unit;

send a set of verification requests to the set of storage units, wherein each of the set of verification requests includes one of a set of slice names corresponding to the set of encoded data slices, wherein each of the set of verification requests includes one of a set of pseudo-randomly generated challenge values, and wherein the set of verification requests includes the verification request;

receive a set of proof of knowledges from the set of storage units in response to the set of verification requests, wherein each of the set of proof of knowledges is generated by one of the set of storage units based on another prover output value, wherein the other prover output value is generated by the one of the set of storage units by performing another combined integrity function on other slice data and the challenge value, and wherein the other slice data is retrieved by the one of the set of storage units from memory based on the one of the set of slice names included in one of the set of verification requests received by the one of the set of storage units;

generate a set of proof of knowledge verification data by evaluating each proof of knowledges for correctness to determine whether each of the set of storage units is in possession of input to the other combined integrity function that yields the corresponding other prover output value;

generate a set of verifier output values for each of the set of verification requests, wherein each of the set of verifier output values is a function of the one of the set of pseudo-randomly generated challenge values of a corresponding one of the set of verification requests and is further a function of one of a set of known slice integrity check values that corresponds to the one of the set of slice names of a corresponding one of the set of verification requests, wherein the set of verifier output values includes the verifier output value;

generate a set of output verification data by extracting the other prover output value from each of the set of proof of knowledges and comparing the other prover output value to one of the set of verifier output values corresponding to the one of the set of verification requests for which the one of the set of proof of knowledges was received in response;

determine the data segment is stored correctly in the set of storage units when the set of proof of knowledge verification data indicates a subset of the set of storage units are in possession of input to the other combined integrity function that yields the corresponding other prover output value, and when the set of output verification data indicates at least a threshold number of the set of verifier output values of the subset of the set of storage units compare favorably to a corresponding other prover output value; and initiate corrective action on the set of storage units when the set of output verification data indicates less than the threshold number of the set of verifier output values compare favorably to the corresponding other prover output value.

20. A computer readable storage medium comprises:
at least one memory section that stores operational instructions that, when executed by a processing system of a dispersed storage network (DSN) that includes a processor and a memory,
causes the processing system to:
- send a verification request to a storage unit, wherein the verification request includes a slice name, and wherein the verification request further includes a challenge value;
- receive a proof of knowledge from the storage unit in response to the verification request, wherein the proof of knowledge is generated by the storage unit based on a prover output value, wherein the prover output value is generated by the storage unit by performing a combined integrity function on slice data and the challenge value, and wherein the slice data is retrieved by the storage unit from memory based on the slice name;
- generate proof of knowledge verification data by evaluating the proof of knowledge for correctness to determine whether the storage unit is in possession of input to the combined integrity function that yields the prover output value;
- generate a verifier output value as a function of the challenge value and a known slice integrity check value that corresponds to the slice name;
- generate output verification data by extracting the prover output value from the proof of knowledge and comparing the prover output value to the verifier output value;

determine the storage unit is storing the slice data associated with the slice name correctly when the proof of knowledge verification data indicates the storage unit is in possession of input to the combined integrity function that yields the prover output value, and when the output verification data indicates the prover output value compares favorably to the verifier output value; and initiate a corrective action on the storage unit when at least one of: the proof of knowledge verification data indicates the storage unit is not in possession of input to the combined integrity function that yields the prover output value, or the output verification data indicates the prover output value compares unfavorably to the verifier output value.

* * * * *